US007786850B1

(12) United States Patent
Arcaini et al.

(10) Patent No.: US 7,786,850 B1
(45) Date of Patent: Aug. 31, 2010

(54) METHOD AND APPARATUS FOR BRIDGE COLLISION ALERT MONITORING AND IMPACT ANALYSIS

(76) Inventors: Gianni Arcaini, 6622 Southpoint Dr. South, Suite 310, Jacksonville, FL (US) 32216; Krishna Mohan Chinni, 6622 Southpoint Dr. South, Suite 310, Jacksonville, FL (US) 32216; Larry Strach, 6622 Southpoint Dr. South, Suite 310, Jacksonville, FL (US) 32216; Israel Umbehant, 6622 Southpoint Dr. South, Suite 310, Jacksonville, FL (US) 32216; Robert Umbehant, 6622 Southpoint Dr. South, Suite 310, Jacksonville, FL (US) 32216; Aydin Arpa, 6622 Southpoint Dr. South, Suite 310, Jacksonville, FL (US) 32216

( * ) Notice: Subject to any disclaimer, the term of this patent is extended or adjusted under 35 U.S.C. 154(b) by 271 days.

(21) Appl. No.: 12/139,532

(22) Filed: Jun. 16, 2008

(51) Int. Cl.
*B60Q 1/00* (2006.01)

(52) U.S. Cl. .................... 340/436; 340/506; 340/539.1; 340/571

(58) Field of Classification Search ................. 340/436, 340/435, 439, 438, 443, 446–449, 506, 510, 340/539.1, 563, 571
See application file for complete search history.

(56) References Cited

U.S. PATENT DOCUMENTS

| | | | | |
|---|---|---|---|---|
| 4,210,789 | A * | 7/1980 | Ushiku et al. | 200/61.45 R |
| 4,761,991 | A * | 8/1988 | Fembock | 73/11.07 |
| 5,079,955 | A | 1/1992 | Eberhardt | |
| 5,445,024 | A | 8/1995 | Riley, Jr. et al. | |
| 5,445,412 | A | 8/1995 | Gillis et al. | |
| 5,809,161 | A | 9/1998 | Auty et al. | |
| 5,999,877 | A | 12/1999 | Takahashi et al. | |
| 6,129,025 | A | 10/2000 | Minakami et al. | |
| 6,206,129 | B1 | 3/2001 | Breed et al. | |
| 6,257,064 | B1 * | 7/2001 | Duron | 73/598 |
| 6,292,967 | B1 * | 9/2001 | Tabatabai et al. | 14/22 |
| 6,329,910 | B1 | 12/2001 | Farrington | |
| 6,537,076 | B2 | 3/2003 | McNitt et al. | |
| 6,542,077 | B2 | 4/2003 | Joao | |
| 6,828,795 | B2 | 12/2004 | Krasnobace et al. | |
| 6,842,620 | B2 | 1/2005 | Smith et al. | |
| 6,894,606 | B2 | 5/2005 | Forbes et al. | |
| 7,097,201 | B2 | 8/2006 | Breed et al. | |
| 7,327,236 | B2 | 2/2008 | Bonitz | |

* cited by examiner

*Primary Examiner*—Daniel Previl
(74) *Attorney, Agent, or Firm*—Lawrence J. Gibney, Jr.

(57) ABSTRACT

This is a method and apparatus for bridge collision alert and monitoring impact analysis, which allows users of the method and apparatus to continuously monitor the integrity of a bridge as well as to detect insult or impact to the bridge structure or both as well as viewing purposes as for forensic purposes. The system is comprised of a series of monitors that gather different pieces of date and integrate that data into a system for view by the operator.

12 Claims, 1 Drawing Sheet

METHOD AND APPARATUS FOR BRIDGE COLLISION ALERT MONITORING AND IMPACT ANALYSIS

BACKGROUND OF THE INVENTION

A. Field of the Invention

This relates to monitoring the state of a bridge for the detection of possible collisions. This is important in order to maintain or insure the continued integrity of the bridge as well as for forensic purposes.

B. Prior Art

There are many other prior art references to monitoring events involving collisions. Some of them involve cameras and some involve real time sensors.

Some of the prior art in this area includes Forbes, U.S. Pat. No. 6,894,606, which is a vehicular byproduct monitoring system that essentially mounts a camera for a means to record data concerning collisions or accidents. Another reference can be found at Minakami, U.S. Pat. No. 6,129,025, which is a traffic or transportation system. Again, the stated purpose is to monitor events for forensic as well as to insure the continued integrity of the structure.

Many references exist in the prior art that relate to collision detection systems. Some of these include Riley, U.S. Pat. No. 5,445,024, Breed U.S. Pat. No. 6,206,129 and Gillis U.S. Pat. No. 5,445,412. These references discuss the use of collision information as it relates to automobile accidents. The Riley and Breed references are fact gathering systems while Gillis gathers information to initiate a system to deploy safety restraint device.

Collecting information about the presence of a collision and analyzing that information can be critical in terms of designing systems to insure the integrity of a structure such as a bridge as well as collecting data to avoid a collision. Most of the prior art in this area relates to the gathering of information with regard to automobile collisions. These systems and devices are certainly useful in terms of providing analysis with regard to moving objects, none of the prior art in this area relates to collision and impact analysis with regard to a fixed or stationary structure such as a bridge. However, because bridges generally carry large amounts of traffic and freight and any interruption in that flow could be detrimental to the general public, any insult to the integrity of the bridge should be constantly monitored.

BRIEF SUMMARY OF THE INVENTION

This is a system for monitoring and analyzing collisions on a bridge and/or fender structure of a bridge. Bridges are typically equipped with a fender structure to absorb impact and, therefore, protect the integrity of the bridge. A collision with a bridge can cause untold delays in the shipment of goods throughout any system and can also interfere with the safe passage of goods in any freight system.

The system itself is composed of a plurality of sensor modules that will collect various pieces of data for appropriate analysis. These multi-sensor data acquisition modules, include a sensory data logging module, a sensory data analysis module, an alarm management module, a video activation module, and a data viewer.

All of these modules are connected so that appropriate integration can occur. Integration of the collected data is necessary to analyze the data.

The information that is collected from the various sensors are inputted into data acquisition hardware, which is then integrated into appropriate software. The software will provide appropriate responses and appropriate remedial instructions or action to various portions of the device as well as to the operators of the system.

Part of this process will include the detection and classification of various data in real time concerning the bridge structure as well as providing an alarm.

Additionally, because this is a fluid system, a video capability should also be included. It is important that the data acquisition module be relatively quick in terms of gathering the data into the multiple sensors and a multithreaded interface is needed to acquire the data. All data information, including the visual representation, can be viewed at a remote site.

DETAILED DESCRIPTION OF THE EMBODIMENTS

Figure 1:
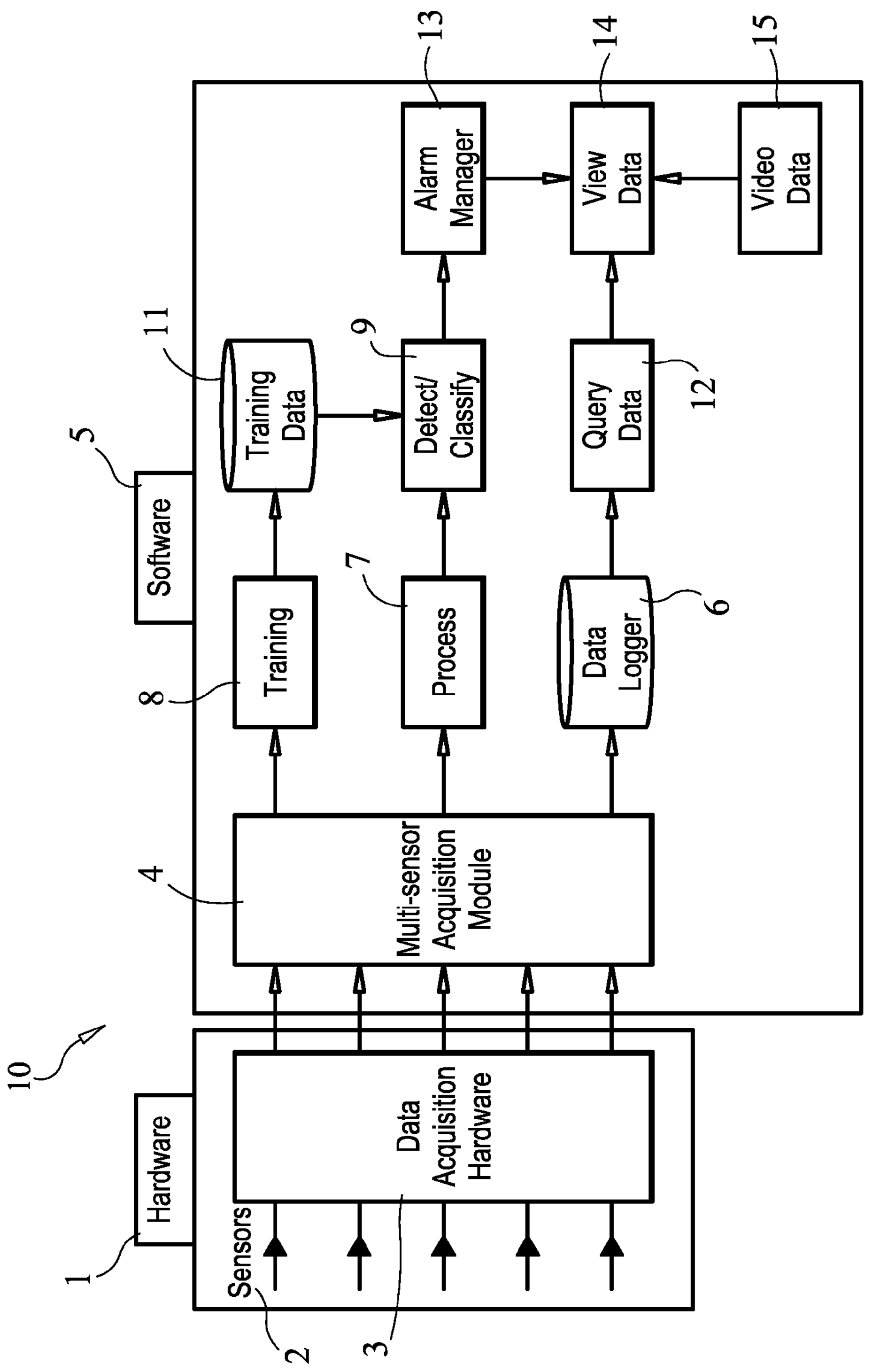
FIG. 1 is a flow chart of the components of the system.

This particular method and apparatus 10 is used for bridge collision alert monitoring and impact analysis both for forensic analysis of events as well as to insure the continued integrity of the bridge or other structure. Although bridges are specifically discussed, the system and its components are not limited to bridges but can be integrated into any free standing structure where the collection of data relative to collisions to that structure is important.

Hardware 1 will gather data from a variety of sensors and route the information to software 5 for collection and analysis. The hardware will include cameras, accelerometers and other sensors that measure impact on a bridge or building structure.

It will be comprised of a series of sensors 2, which will detect and collect certain information and then relay that information to data acquisition hardware 3. These sensors will include but not necessarily be limited to cameras, accelerometers and other types of sensors to measure impact.

The data acquisition hardware 3 is integrated with software 5 that will then analyze the information, display an image and provide alarms depending on certain preset factors.

A multi-sensor acquisition module 4 is part of the software that can then integrate the collected data from the data acquisition hardware 3 and provide relevant and timely information for the operator or user of the system. The placement of video capture devices will also be used to capture information relevant to this method.

The process and method will be comprised of a series of sensors 2 that will collect various pieces of relevant data and supply that information to hardware.

The system will also include a series of modules including a multi-sensor data acquisition module 4, a sensor data logging module 6, a sensor data analysis module 7, an alarm management module 13 and a video acquisition module 9. In order to view the information in real time, a data viewer 14 will also be included.

The multi-sensor acquisition module 4 is linked to the data acquisition hardware 3 and will implement the other modules. The multi-sensor acquisition module 4 gathers the sampled and quantized data from the data acquisition hardware 3.

The sensor data logging module 6 will take required data and store the sensory data for multiple sensors. The data can be logged in the following ways: database, XML, or file system. Stored data can be viewed in any kind of interface like Web interface or Rich Client interface. Other methods to store and view the data may also be used. Data references can be stored in a query data module 12 to enable the system to distinguish between ordinary and unusual events.

The sensor data analysis module 7 will gather and analyze the information collected to detect the presence of any anomalies occurring in the system. False alarms such as traffic or bridge events, which do not necessarily impact the integrity of the bridge can be preset into the software so that a false positive will not be recorded because of a normal event as part of the detection and classification feature of the system.

The training module 8 is installed to learn specific events from background processes or to distinguish different events and store these events in a training data file. Viewed over time, there are certain routine events that happen on any bridge, including traffic flow and this information must be placed in the training database 11 for training and specific classifier. It is critical for the system to discriminate "normal" events from events that warrant remedial action.

The captured data in the system can be used directly for classification or features can be extracted. Feature extraction methods that can be used are frequency domain analysis and octave analysis to name a few representative examples.

The training data 11 is fed to a classifier 9 so that the system and the operator can distinguish between different data caused by different events. The training classifier 9 can also be stored for online classification purposes and the classification of the data can be accomplished through state-of-the-art classifiers like Support Vector Machines or Neural Networks.

In terms of ease of use, the training classifier 9 should be used online. Incoming data is fed to the classifier 9, and the classifier makes the decision on which kind of event has occurred. This information can then be given to the operator of the system for appropriate action. The information can also be relayed to an alarm manager 13 to send an alarm based on certain preset variables.

The purpose of the alarm management module 13 is to manage alarms produced by different events occurring in the system. When a classifier detects an event, it notifies the alarm manager regarding the event and sends the data regarding the event. The alarm manager 13 keeps track of all the events produced. For instance, if a railway bridge track is misaligned, an alarm 13 should immediately be sent so that misalignment of tracks can be monitored by sensors for recording and/or viewing purposes.

The video acquisition module 14, as its name implies, acquires the video data 15 from a plurality of fixed cameras for logging purposes and can be viewed at any time. Because the type of structure that is monitored is subjected to oftentimes adverse environmental conditions including dim lighting, the video cameras should incorporate infrared capability and be able to operate in adverse lighting and weather conditions. Additionally the cameras should be capable of high resolution and possess the ability to zoom in and out of a given location.

The accelerometer is a device that will measure the vibration or acceleration of motion of a structure. In one type of accelerometer, the force caused by the vibration of a change in motion to the structure will "squeeze" the piezoelectric material which will produce an electrical charge that is proportional to the force exerted upon it. Since the charge is proportional to the force and the mass is constant, the charge is proportional to the acceleration. This type of device can be placed on the bridge or bridge fender structure.

Additionally, the data viewer 14, which synchronizes the video data, sensor data, and alarm events, displays the information so that events can be browsed and viewed in real time. The viewing of this information can be accomplished at remote sites. Individual frame extraction is provided and all data can be stored for historical purposes or forensic purposes.

The inventors claim:

1. A method and apparatus for bridge collision alert monitoring and impact analysis, which is comprised of:

a. hardware;

wherein hardware to operate the system is provided;

wherein the hardware is comprised of a plurality of sensors;

wherein the hardware is comprised of a means of data acquisition;

said hardware is of a predetermined type;

b. sensors;

wherein a plurality of sensors gather information related to a collision with a bridge;

c. software;

wherein software is integrated with the hardware;

wherein said information is collected by the hardware and transmitted to the software;

wherein the software is comprised of a plurality of modules;

said software has certain features;

d. a plurality of modules;

wherein the modules gather data related to a collision alert monitoring impact analysis system;

said modules are interfaced within the software;

e. multi-sensory data acquisition module;

wherein the multisensory data acquisition module receives information from the data acquisition hardware;

wherein this module interfaces with the hardware and controls the interfaces with the hardware to control the interaction of events and extracts data;

f. sensory data logging module;

wherein a sensory data logging module is provided;

wherein the data is logged in a plurality of ways;

wherein the data is viewed in a plurality of ways;

g. sensory data analysis module;

wherein the sensory data analysis module is provided;

wherein the sensory data analysis module detects anomalies in the system;

h. a training module;

wherein a training module is provided;

wherein certain preset information is provided in the training module;

i. a classification module;

wherein a classification module is provided;

said classification module is equipped with a training classifier;

wherein the training classifier is used online;

j. an alarm management module;

wherein the alarm management module manages the alarms produced by different events;

k. a video acquisition module;

wherein a video acquisition module is provided;

wherein the video acquisition module permits video capability of events;

l. a data viewer;

wherein a data viewer synchronizes the video data, sensory data, and alarm events;

wherein the events are displayed on the data viewer;

wherein a browsing capability for the data viewer is provided;

wherein a feature extraction capability is provided.

2. The method and apparatus as described in claim 1 wherein the information from the database.

3. The method and apparatus as described in claim 1 wherein the information from the sensor data logging module is stored in an XML format.

4. The method and apparatus as described in claim 1 wherein the information from the sensor data logging module is stored in a file format.

5. The method and apparatus as described in claim 1 wherein the data is viewed in a Web interface.

6. The method and apparatus as described in claim 1 wherein the data is viewed in a Rich Client interface.

7. The method and apparatus as described in claim 1 wherein the feature extraction capability is accomplished through domain analysis.

8. The method and apparatus as described in claim 1 wherein the feature extraction analysis.

9. The method and apparatus as described in claim 1 wherein the information from the training classifier is used with Support Vector Machines.

10. The method and apparatus as described in claim 1 wherein the information from the training classifier is used with Neural Networks.

11. The method and apparatus as described in claim 1 wherein the sensors are comprised of a plurality of cameras.

12. The method and apparatus as described in claim 1 wherein the sensors are comprised of a plurality of accelerometers.

* * * * *